Sept. 16, 1924.                                                    1,508,748
                    H. A. GALE ET AL
           MACHINE FOR MAKING BOX SHOOKS
              Filed Oct. 23, 1922          6 Sheets-Sheet 2

Inventors
H. A. Gale.
O. S. Cook.
By Attorneys

Sept. 16, 1924.

H. A. GALE ET AL 1,508,748

MACHINE FOR MAKING BOX SHOOKS

Filed Oct. 23, 1922    6 Sheets-Sheet 4

Inventors.
H.A. Gale.
O.S. Cook.
By Attorneys.

Sept. 16, 1924.  1,508,748
H. A. GALE ET AL
MACHINE FOR MAKING BOX SHOOKS
Filed Oct. 23, 1922  6 Sheets-Sheet 5

Inventors
H.A. Gale.
O.S. Cook.
By Attorneys

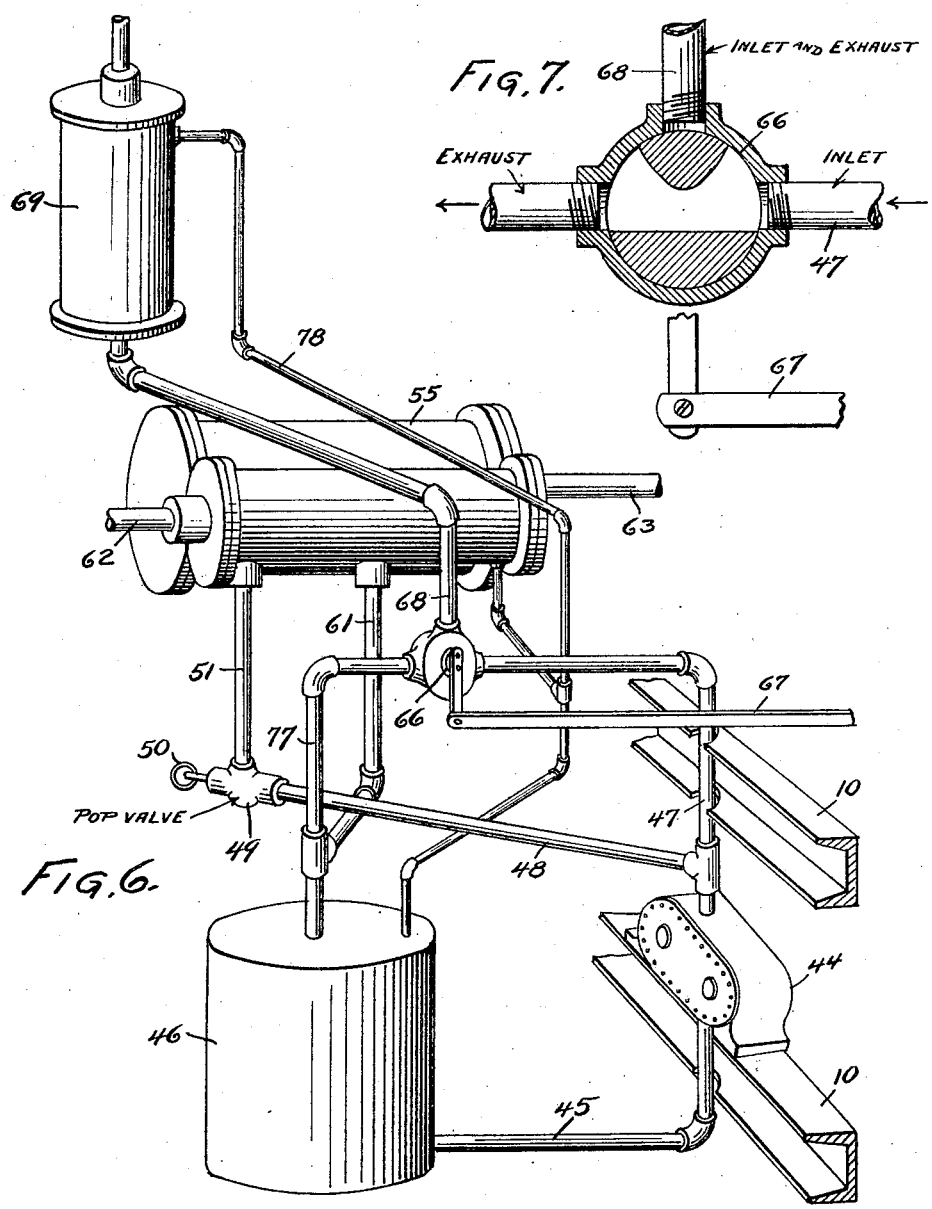

Patented Sept. 16, 1924.

1,508,748

UNITED STATES PATENT OFFICE.

HENRY A. GALE AND ORNAN S. COOK, OF FITCHBURG, MASSACHUSETTS; SAID COOK ASSIGNOR TO SAID GALE.

MACHINE FOR MAKING BOX SHOOKS.

Application filed October 23, 1922. Serial No. 596,186.

*To all whom it may concern:*

Be it known that we, HENRY A. GALE and ORNAN S. COOK, both citizens of the United States, residing at Fitchburg, in the county of Worcester and State of Massachusetts, have invented a new and useful Machine for Making Box Shooks, of which the following is a specification.

This invention relates to a machine for squeezing together previously matched and glued boards to bring them into their final condition for forming box shooks, and for trimming the sides of the joined boards to bring them to the required width.

The principal objects of the invention are to simplify the construction of the shook machines which have been used heretofore; to provide means for more effectively and automatically clamping the boards down on the table before they are squeezed together for preventing the boards from buckling; to provide means for performing the squeezing and the holding down operations automatically controlled by oil pressure and at the same time provide for operating on sets of boards having varying widths and also varying thickness; to provide for locating all the controlling hand wheels and levers at one side and end of the machine so that it can be operated by a minimum number of men; and to provide improvements in the details of construction and combinations of parts of these operating means.

Further objects and advantages of the invention will appear hereinafter.

Reference is to be had to the accompanying drawings, in which—

Fig. 6 is a perspective view of the piping and its connections;

Fig. 7 is a section of a controlling valve; and

Figure 1:
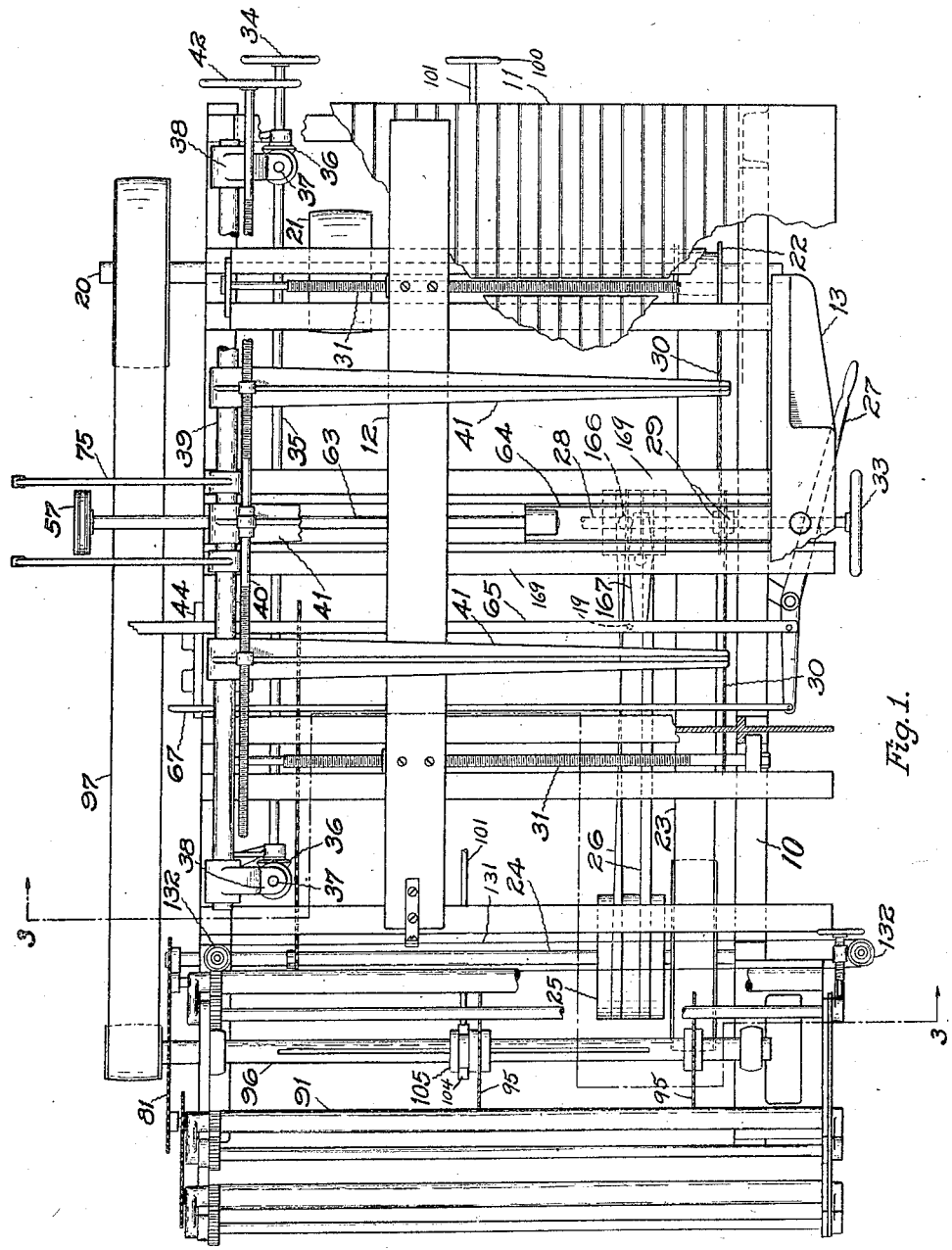
Fig. 1 is a plan of a box shook machine constructed in accordance with this invention with the operating cylinders and piping omitted.
Figure 2:
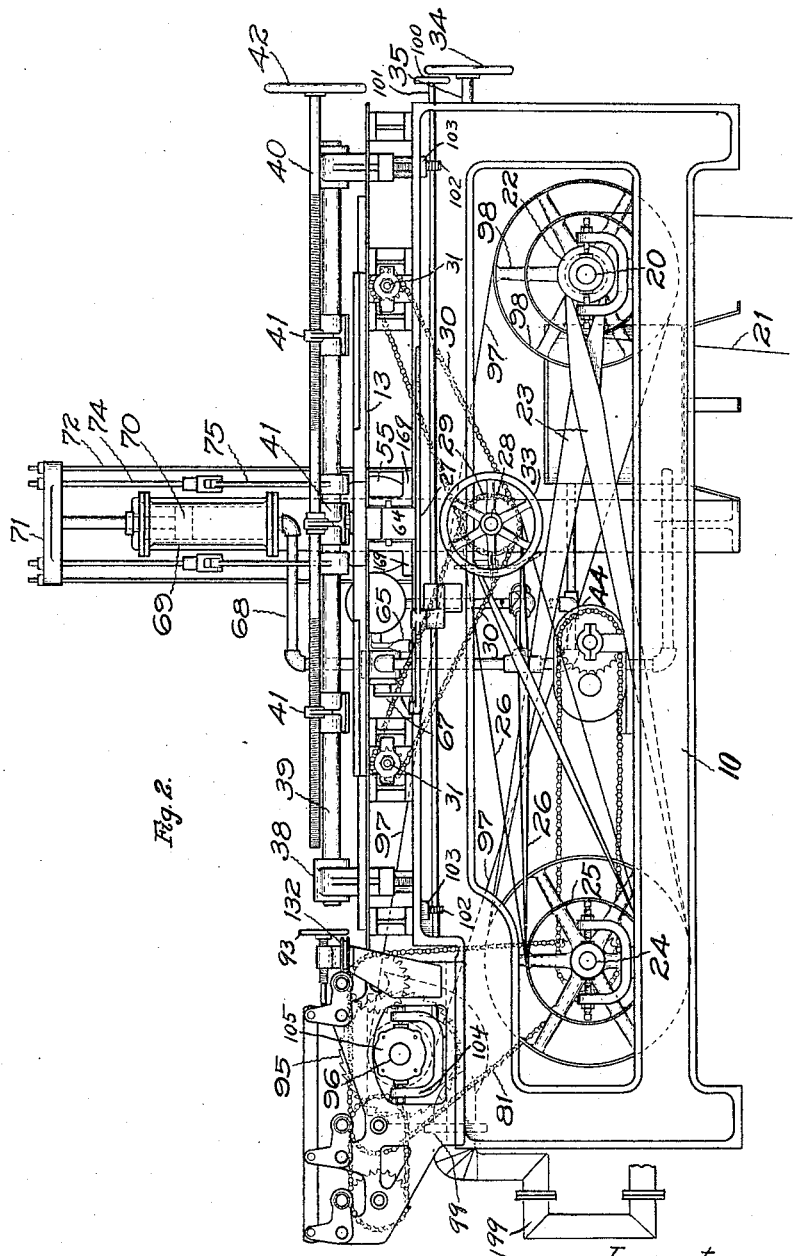
Fig. 2 is a front elevation.

I have shown the machine in a form involving a frame 10 which has a horizontal top or table 11 for supporting the boards used in making up a box shook and provided with a so-called stationary, but adjustable, press jaw 12 between which and the pivoted reciprocable press jaw 13 the shook is pressed on said table. Although the machine can be driven from a motor or in any other desired way, I have illustrated it as provided with a driving shaft 20 receiving power from a belt 21 or any desired source, and provided with a pulley 22 which by means of belts 23 drives a second horizontal shaft 24. This shaft 24 is provided with tight and loose pulleys 25, which by means of open and crossed belts 26 drive a shaft 28 near the center of the machine.

This shaft 28 is located substantially at the center of the table 11 and is provided with drive sprocket wheels 29 which by means of oppositely extending chains 30 drive a pair of transverse shafts 31. These shafts are screw-threaded throughout their lengths and constitute adjusting screws. They pass through nuts 32 on the under side of the so-called stationary press jaw 12 and move the latter for adjusting purposes. This shaft 28 can be turned by hand for the same purpose by a hand wheel 33 on its front end located near the feeding in end of the machine within the reach of an operator stationed there. On the end of the jaw 12 the two ends of a tape 131 are fixed. The tape passes over two pulleys 132 on opposite sides of the machine. On this tape is a scale 134 movable over a pointer 133 to indicate the position of the jaw 12.

The table is provided at the feeding in end with a hand wheel 34 on a longitudinal shaft 35, which shaft is connected by bevel gears 36 with a pair of vertical screws 37 to provide vertical adjustment for two brackets 38 which carry a longitudinal clamp shaft 39. This adjustment is to provide for boards of different thicknesses.

Figure 3:
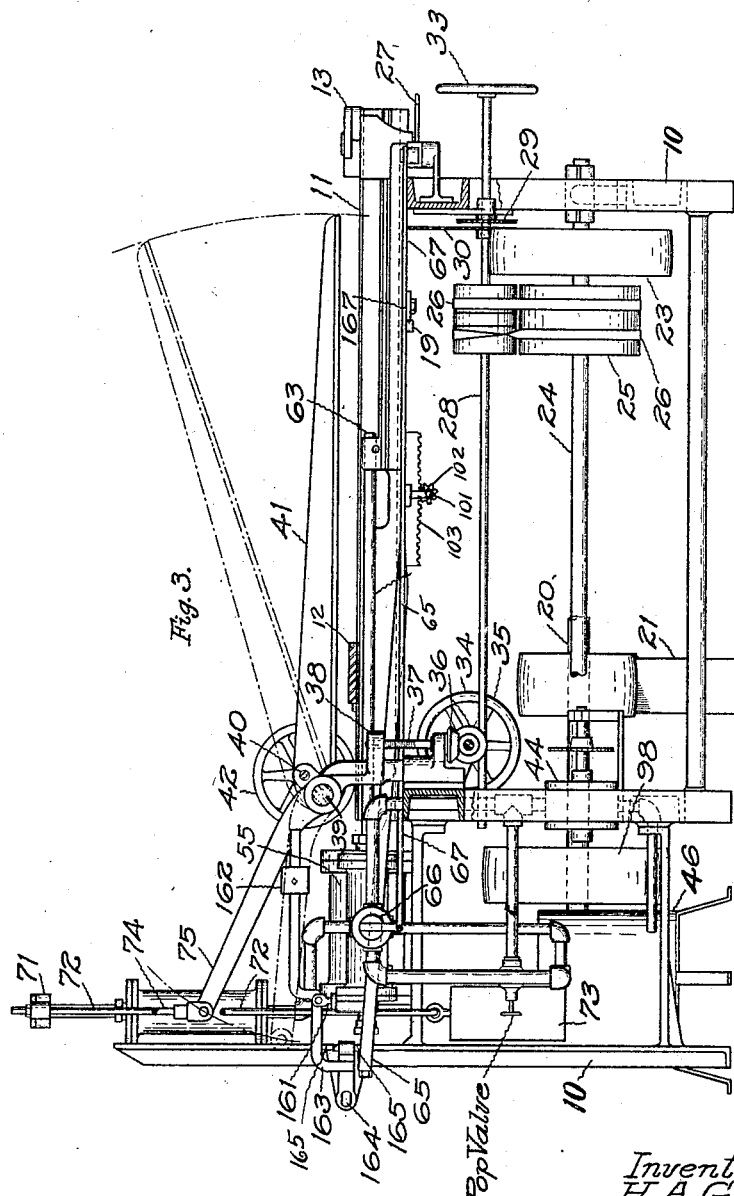
Fig. 3 is a sectional view on the line 3—3 of Fig. 1 with the feeding out rolls omitted.
Figure 4:
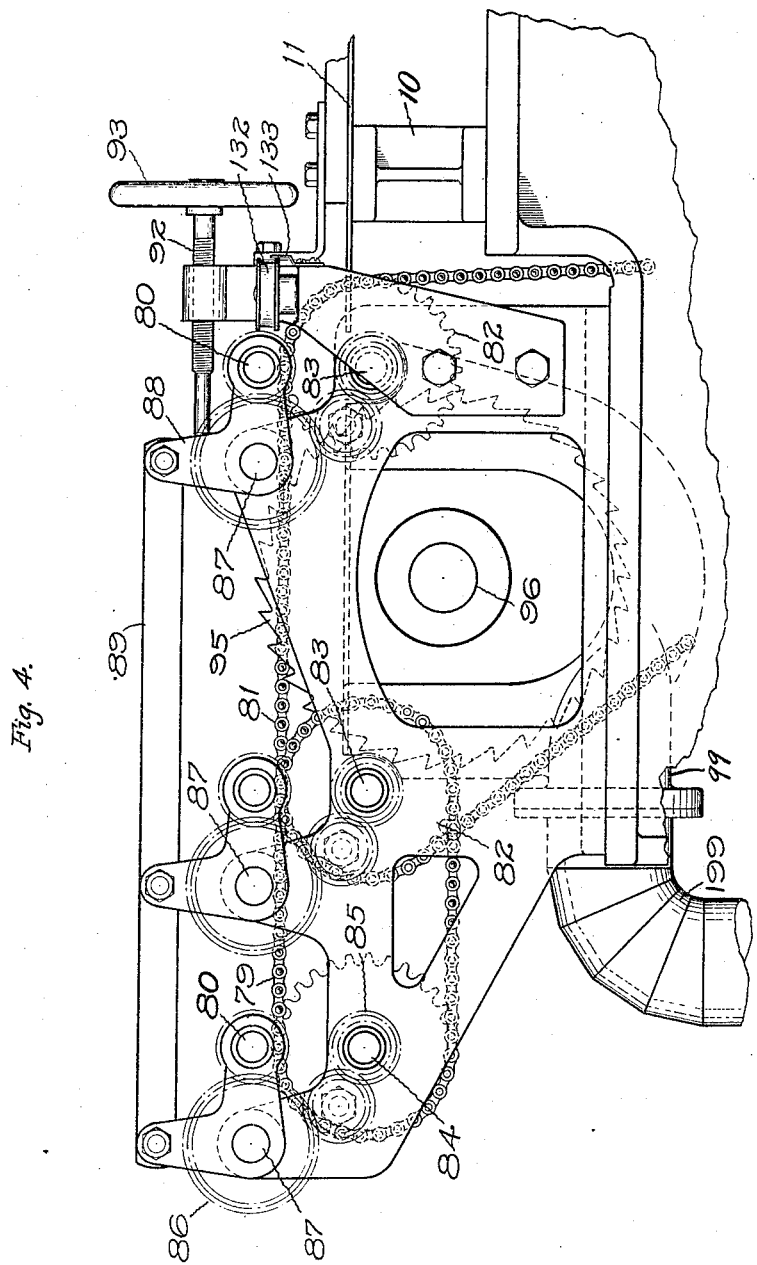
Fig. 4 is an enlarged front elevation showing the feeding out roll drive and adjustment.

On the top of the machine there is a longitudinal screw 40 having right and left hand threads at its opposite ends. This screw is supported by means of three clamp arms 41 extending out over the table. These arms are fixed on the clamp shaft 39 to swing with it on its center. By means of screw-threaded passages through the arms which mesh with the threads of the screw 40 the two end arms are adjustable. A hand wheel 42 on the end of this shaft is operated from the feeding in end for turning the shaft in either direction to move the two end clamp arms 41 toward or from each other to adjust the device for shooks of different lengths. The central arm 41 is not adjustable. These clamping arms are intended to come down on the boards to hold them down on the table to prevent buckling while the boards are being pressed together. As they are pivoted along the rear side and there is no mechanism along the front side, the boards are readily accessible from the front when the arms are up in the dotted line position shown in Fig. 3.

Figure 5:
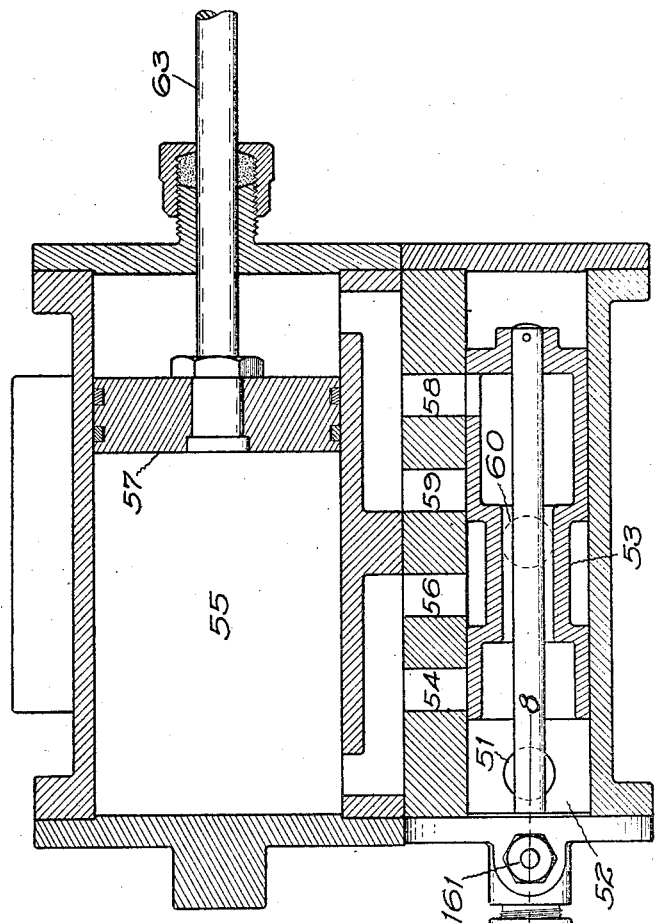
Fig. 5 is an enlarged central sectional view of the operating cylinders and valves.
Figure 8:
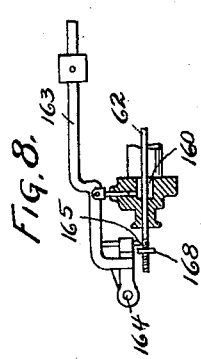
Fig. 8 is a sectional view on the line 8—8 of Fig. 5.

The movable jaw 13 is intended to be moved by power transversely of the table for clamping the shook against the so-called stationary jaw 12 after it is adjusted. This is done by means of a rotary liquid or oil pump 44. This pump is operated by a chain from the shaft 24 or other driving means. It takes oil through a pipe 45 from a reservoir 46 and discharges it under pressure into a vertical pipe 47 which leads it into two paths. One of these is through a pipe 48 and pop valve 49 which is normally closed by a spring set by means of a controlling rotary valve wheel 50 to open at a pressure of fifty pounds per square inch. When the valve 66 is closed, the pressure in the piping goes up and the valve 49 opens. This lets the oil through a pipe 51 and inlet into a valve chamber 52. The valve in this chamber normally remains in neutral position in which all the ports are open so that the oil can circulate freely without moving the piston 57. The operator moves the lever 27 to draw the valve 53 back to the position shown in Fig. 5.

When the valve 53 is moved to this position it leaves the ports 56 and 58 wide open and closes the ports 59 and 54. Therefore, the oil can enter from the pipe and inlet 51 through the interior of the hollow valve 53 to the right side of the piston 57 in the cylinder 55 and the oil in the left hand side of the cylinder in Fig. 5 will flow out through the port 56 and outlet 60. The exhaust port 60 is connected with a pipe 61 which leads the oil back into the reservoir 46.

There is a port 160 extending from the valve chamber 52 for applying pressure to the lower end of a single acting plunger 161 to raise it when the pressure gets high enough. This plunger is held down by a weight 162 adjustable along a lever 163 pivoted at 164. The lever carries a pin 165 having a slanting lower edge, the other side of which engages an adjustable collar 168 on the valve rod 62 to hold the valve in the position shown in Fig. 5. The rod 62 is positively connected to a rod 65 operated by the lever 27 at the front of the machine. When the plunger 161 is raised by the pressure under it the valve 53 is free to move automatically to its extreme right hand position because it has to be closed against fluid resistance at the left, leaving a rarefied air space at the right. The valve will be moved to neutral position by the opening movement of the jaw 13. A pin 166 on a slide 64 engages a lever 167 pivoted on one of the two stationary guides 169 for the slide 64. The other end of the lever 167 engages a downwardly extending pin 19 connected with the rod 65. This occurs when the jaw is moved back as far as it will go and results in moving the rod 65 backwardly.

The piston 57 has a piston rod 63 which reciprocates, of course, with the piston and carries with it the slide 64 which is pivotally connected with the jaw 13. This piston therefore operates this jaw to open and close it and to apply pressure to a box shook on the table 11 when forced forward.

The pipe 47 also extends up into a valve 66 which is designed to be operated by a valve link 67 connected with the end of the lever 27 beyond its connections to the rod 65 and movable therewith. Therefore when this lever is moved in one direction it will not only move the valve 53 from the position shown in Fig. 5 but will open the valve 66 and allow the oil to pass up a pipe 68 into the bottom of a vertical cylinder 69. This at once forces up the piston 70 in said cylinder which, through its rod raises a head 71. This head is provided with depending rods 72 which support counterweights 73 below for raising the arms. It is provided also with a pair of rods 74 connected with a pair of levers 75 fixed on the clamp shaft 39 which carries the pressure arms 41.

The forcing of the oil into the cylinder 69 therefore brings down the arms 41 on the shook to hold it against buckling, as stated above, before it acts to bring up the squeeze jaw 13. When the valve 66 is closed a passage is provided through it for the oil to be delivered back into the tank through a pipe 77 which connects with the pipe 61 below. Any oil that leaks by the piston in the cylinder 69 escapes through a drain pipe 78. This also is directed back into the reservoir 46. A drain from the casing of the valve 53 also connects with the pipe 78.

After the box shook is pressed up in this way and the pressure released it is moved along on the end of the table between the feeding-out rolls 80 which are arranged in a plurality of pairs, the bottom and top rolls being positively driven by a drive chain 81 on a sprocket wheel on the shaft 24.

This sprocket chain passes over two drive wheels 82 on horizontal shafts 83. On one of these shafts there is another sprocket wheel like the wheel 82 and another chain 79 on it drives another shaft 84 in the same way. These three shafts are in alignment and each of them is provided with a gear 85 which, through suitable gearing, drives a gear 86 on a shaft 87 which is mounted in stationary bearings. On each of these shafts 87 there is pivoted a bell crank 88. The upwardly extending arms of all these bell cranks are connected across by a rod 89 so that the bell cranks always work together. Each bell crank also has a horizontal arm which supports a shaft 80 on which the upper feeding-out rolls 91 are mounted, three of them being shown. These rolls are therefore positively driven in the manner set forth. The lower feeding-out rolls are mounted on the shafts 83 and 84 to be driven in the same direction. The weight of the upper feeding-out rolls holds them down against the lumber hard enough so that the shooks will be moved out by them. It will be observed that the series of bell cranks 88 are adjusted by a screw 92 having an adjusting wheel 93 for that purpose to place them at the proper elevations for lumber of different thicknesses.

Mounted between two of these feeding-out rolls are a pair of rip saws 95 one of which is adjustable along a key way in the shaft 96 which is driven by a belt 97 from a pulley 98 on the shaft 20 or from a separate motor if desired. One of these rip saws trims one side edge of the box shook and if wide enough the other cuts it in two as it passes out and while it is held between two pairs of feeding-out rolls. One saw is adjusted in accordance with the position of the pointer 133 by a hand wheel 100 at the feeding in end of the machine. This hand wheel is on a longitudinal shaft 101 having two pinions 102 fixed thereon. Each pinion meshes with and rolls along a transverse rack 103 having its teeth on the bottom so that the shaft, which is supported by the racks, moves along guide ways as they turn. Slidable on one rack and movable with the shaft 101 is a fork 104 engaging a collar 105 on the adjustable saw to move it along its shaft.

The sawdust from each saw is taken out through a hood 99 and pipe 199 in any desired way, a blower preferably being employed for this purpose but not shown herein. One of the hoods and pipe is adjustable with the adjustable saw. For this purpose the pipe is made with three parallel pivot joints 94 to permit it to swing as the saw is adjusted.

The operation of the machine will be obvious from what has been stated. The lumber is matched, the matched edges glued and fitted together and pressed together temporarily to form a blank shook and this is placed on a table 11. The shaft 39 is adjusted vertically by turning the hand wheel 34 to bring it to the proper elevation for the thickness of the boards. The jaw 12 is adjusted by means of the screws 31 either by hand through the hand wheel 33 or by power through the belts 26 and the jaw 13 is forced inwardly after the arms 41 are lowered on the shook by the oil operated devices described above. These are then released and the shook is moved along the table in any desired way between the guide rolls and out over the rip saws which trim them on one edge or split it while the shook is taken from the machine.

This forms a rapidly operating machine which requires comparatively little attention and only one operator because all the controlling devices except the adjusting wheel 93 are located at the taking-in end of the machine and are easily reached. The shooks are delivered with the side edge trimmed and their end edges can be trimmed in any convenient way.

Although we have illustrated and described only a single form of the invention, we are aware of the fact that modifications can be made therein by any person skilled in the art without departing from the scope of the invention as expressed in the claims. Therefore, we do not wish to be limited to all the details of construction herein shown and described but what we do claim is:—

1. In a box shook machine, the combination of a table on which the matched boards for forming the box shooks are adapted to be placed, of a clamp shaft extending along the table near one edge thereof, and a plurality of clamp arms fixed on said shaft and adapted to be swung about the axis of the shaft, down toward the table into horizontal position across the table to hold down the boards and prevent their buckling, the arms not being connected with the table at their free ends at the front edge of the table.

2. In a box shook machine, the combination of a table on which the matched boards for forming the box shooks are adapted to be placed, of a clamp shaft extending along the table near one edge thereof, a plurality of clamp arms rigid on said shaft and adapted to be moved by the turning of the shaft down toward the table into horizontal position to hold down the boards and prevent their buckling, and means for vertically adjusting the clamp shaft to adapt the device for use on boards of different thicknesses.

3. In a box shook machine, the combination of a table, a clamp shaft on the table, arms mounted on said shaft to turn therewith, whereby the shaft can be oscillated to bring the arms down over the table and parallel therewith to hold the boards down on the table, means for adjusting the elevation of said clamp shaft comprising two vertical screws connected therewith, a horizontal shaft for operating said screws simultaneously and quickly, and a hand wheel thereon, so that the adjustments for thickness of the board can be made conveniently by the operator who is in a position to feed the shook into the machine.

4. In a box shook machine, the combination of a table, a clamp shaft extending along the table, three arms mounted on said shaft to turn therewith, whereby the shaft can be oscillated to bring the arms down flat over the table to hold the boards down on the table, the central arm being fixed to the shaft and the others movable therealong, and means for connecting the three arms together so that they will all swing in unison.

5. In a box shook machine, the combination of a table, a clamp shaft extending along the table, three arms mounted on said shaft to turn therewith, whereby the shaft can be oscillated to bring the arms down over the table parallel therewith to hold the boards down on the table, a right and left hand screw supported by the central arm, and nuts on the end arms engaging said screw, whereby the turning of the screw will adjust the two end arms toward and from each other to accommodate box shooks of different lengths.

6. In a box shook machine, the combination of a stationary table, a clamp shaft extending along the table longitudinally, three arms mounted on said shaft to turn therewith, whereby the shaft can be oscillated to bring the arms down over the table to hold the boards down on the table, a right and left hand screw supported by the central arm, nuts on the end arms engaging said screw, whereby the turning of the screw will adjust the two end arms toward and from each other to accommodate box shooks of different widths, a hand wheel on said screw located at the feeding in end of the machine in a position convenient for manipulation by the operator who is feeding in the boards, means for adjusting the elevation of said clamp shaft comprising two vertical screws connected therewith, a horizontal shaft for operating said screws simultaneously and quickly, and a hand wheel thereon located adjacent to the first named hand wheel so that the adjustments for thickness and length of the box shook can be made conveniently by the operator who is in a position to feed the shook into the machine.

7. In a box shook machine, the combination of a table, a clamp shaft, arms mounted on said shaft to turn therewith, whereby the shaft can be oscillated to bring the arms down over the table to hold the boards down on the table, means for adjusting the two end arms toward and from each other to accommodate box shooks of different lengths, a hand wheel for operating said means located at the feeding in end of the machine in a position convenient for manipulation by the operator who is feeding in the boards, and means for adjusting the elevation of said clamp shaft comprising a horizontal shaft and a hand wheel, both of said hand wheels being located at the right hand edge of the front end of the machine in a position at the right hand of the operator.

8. In a box shook machine, the combination of a table, a clamp shaft, arms mounted on said shaft to turn therewith, whereby the shaft can be oscillated to bring the arms down over the table to hold the boards down on the table, means for adjusting the two end arms toward and from each other to accommodate box shooks of different lengths, a hand wheel for operating said means located at the feeding in end of the machine in a position convenient for manipulation by the operator who is feeding in the boards, means for adjusting the elevation of said clamp shaft comprising a horizontal shaft and a hand wheel, both of said hand wheels being located at the right hand edge of the front end of the machine in a position at the right hand of the operator, an adjustable squeeze jaw against which the edge of the box shook is adapted to be placed, a movable squeeze jaw for squeezing the shook against the adjustable jaw, and means for adjusting the adjustable jaw comprising a pair of transverse screws, a shaft for turning said screws to simultaneously adjust both ends of the jaw, a hand wheel at the front of the machine at the operator's left hand for turning the last named shaft by hand and power operated means for turning the last named shaft.

9. In a box shook machine, the combination of a table, a clamp shaft on the table, arms mounted on said shaft to turn therewith, whereby the shaft can be oscillated to bring the arms down over the table to hold the boards down on the table in position to extend across it, a pair of levers fixed to said shaft for oscillating it, said levers extending upwardly and backwardly therefrom, and means connected with said levers for positively raising them and forcing the arms down on the box shook.

10. In a box shook machine, the combination of a table, a clamp shaft extending along the table longitudinally, arms mounted on said shaft to turn therewith from an inclined position over the table to a horizontal position, whereby the shaft can be oscillated to bring the arms down over the table to hold the boards down on the table, levers fixed to said shaft and constituting the sole means for oscillating it and holding the arms down, said levers extending upwardly and backwardly therefrom, a cylinder having a piston therein, means for introducing a liquid into the cylinder to operate the piston, the piston having a rod extending upwardly therefrom, a head on the end of said rod, and rods extending downwardly from the head and connected with said levers for positively raising them and forcing the arms down on the box shook.

11. In a box shook machine, the combination of a stationary table, a clamp shaft on the table, arms mounted on said shaft to turn therewith, levers fixed to said shaft for oscillating it, a vertical cylinder, a piston therein having a rod extending vertically and upwardly therefrom, a head on the end of said rod, rods extending downwardly from the head and connected with said levers for positively raising them and forcing the arms down on the box shook and holding them in clamping position, a hand controlled valve for controlling the admission of liquid under pressure into said cylinder, a link connected with said valve for opening it, and a lever at the front of the machine connected with said link for operating it.

12. In a box shook machine, the combination of a table, a clamp shaft thereon, arms mounted on said shaft to turn therewith, means for adjusting the elevation of said clamp shaft, a horizontal shaft for operating said adjusting means, a hand wheel on said shaft, said hand wheel being located at the right hand edge of the front end of the machine in a position at the right hand of the operator, an adjustable squeeze jaw against which the edge of the box shook is adapted to be placed, a movable squeeze jaw for squeezing the shook against the adjustable jaw, screws for adjusting the adjustable jaw, a shaft for turning said screws to simultaneously adjust both ends of the jaw, a lever on said clamp shaft extending upwardly and rearwardly therefrom, a cylinder having a piston connected with said lever for turning the shaft and forcing the clamp arms down toward the table, a valve for controlling the admission of liquid to said cylinder, a link connected with said valve, and a lever for operating said link.

13. In a box shook machine, the combination with a table on which matched boards are adapted to be placed for forming box shooks, of a set of clamping arms pivotally mounted over said table, a cylinder and piston connected with said arms for operating them, a reciprocatory squeeze jaw movable along the top of said table for exerting pressure on the boards to force them together, a second cylinder having a piston directly connected with said squeeze jaw for pulling it positively in a direction to squeeze the boards together, and means whereby the first piston is operated first to bring the clamping arm down on the box shook and thereafter the second piston is operated automatically to squeeze the boards together under said arms.

14. In a box shook machine, the combination of clamping arms pivotally mounted, a cylinder and piston connected with said arms for operating them, a reciprocatory squeeze jaw for exerting pressure on the boards to force them together, a second cylinder having a piston connected with said squeeze jaw for pulling it in a direction to squeeze the boards together, and means whereby the first piston is operated first to bring the clamping arms down on the box shook and thereafter the second piston is operated to squeeze the boards together.

15. In a box shook machine, the combination of clamping arms pivotally mounted, a cylinder and piston connected with said arms for operating them, a reciprocatory squeeze jaw, a second cylinder having a piston connected with said squeeze jaw for pulling it in a direction to squeeze the boards together, pipe connections for introducing a liquid into both of said cylinders, a constantly operating pump for forcing the liquid into the pipe connections, a valve for controlling the entrance of the liquid from the pump into the first named cylinder, hand operated means for operating said valve, and a pop valve located in said connections in position to control the admission of liquid under pressure from the pump into the second cylinder, said pop valve being adapted to be set to open when the pressure reaches a certain degree whereby the second cylinder will not operate until the elapse of a period of time after the arms have clamped the boards down.

16. In a box shook machine, the combination with a table on which matched boards are adapted to be placed for forming box shooks, a set of clamping arms pivotally mounted over said table, a cylinder and piston connected with said arms for operating them, a reciprocatory squeeze jaw movable along the top of said table for exerting pressure on the boards to force them together, a second cylinder having a piston directly connected with said squeeze jaw for pulling it positively in a direction to squeeze the boards together, pipe connections for introducing a liquid into both of said cylinders, a pump for forcing the liquid into the pipe connections, the entrance of the liquid from the pump into the first named cylinder being controlled by a valve, hand operated means for operating said valve located near the end of the table within reach of the operator stationed at that point, and a pop valve located in said connections in position to control the admission of liquid under pressure from the pump into the second cylinder, said pop valve being adapted to be set to open when the pressure reaches a certain degree.

17. In a box shook machine, the combination of a table on which matched boards are adapted to be placed for forming box shooks, clamping arms pivotally mounted over said table, a cylinder and piston connected with said arms for operating them, a reciprocatory squeeze jaw movable along the top of said table, a second cylinder having a piston connected with said squeeze jaw for pulling it in a direction to squeeze the boards together, pipe connections for introducing a liquid into both of said cylinders, means for forcing the liquid into the pipe connections, a valve for controlling the entrance of the liquid into the first named cylinder, means for operating said valve, a pop valve located in said connections in position to control the admission of liquid under pressure from the pump into the second cylinder, said pop valve being adapted to be set to open when the pressure increases to a certain degree, the first named valve having a passage for permitting the liquid to flow back when the valve is closed against admission of liquid into the first named cylinder, and a conduit for conducting the liquid from the exhaust side of the first named cylinder.

18. In a box shook machine, the combination of a set of pivoted arms adapted to swing down on the top of a box shook to hold it in position, a jaw for squeezing the parts of the shook together, a cylinder having a piston therein, means for connecting said piston with the arms to force them down by liquid pressure, a continuously operating rotary pump, a pipe system connected with the pump, a hand operated valve in said system for connecting it with the said cylinder and for returning the liquid to the pump, a second cylinder having a piston therein movable in the same direction with said jaw and connected with it to move the jaw, a valve casing adjacent the last named cylinder having an inlet, and an automatic valve therein adapted to admit pressure to one side of the second piston when the liquid is forced into its inlet, a pop valve connected with the piping system and with said inlet, arranged to admit liquid automatically into said inlet when the pressure in the pipe system reaches a predetermined degree, and hand operated means for moving the automatic valve into position to open the inlet to the cylinder.

19. In a box shook machine, the combination of a set of arms adapted to swing down on the top of a box shook to hold it in position, a jaw for squeezing the parts of the shook together, a rotary pump, a pipe system connected with the pump, a cylinder having a piston therein movable in the same direction with said jaw and connected with it to move the jaw, a valve casing adjacent the last named cylinder having an inlet, an automatic valve therein adapted to admit pressure to one side of the piston when the liquid is forced into its inlet, and a pop valve connected with the piping system and with said inlet arranged to admit liquid automatically into said inlet when the pressure in the pipe system reaches a predetermined degree.

20. In a box shook machine, the combination of a set of arms adapted to swing down on the top of a box shook to hold it in position, a jaw for squeezing the parts of the shook together, a rotary pump, a pipe system connected with the pump, a cylinder having a piston therein movable in the same direction with said jaw and connected with it to move the jaw, a valve casing adjacent the last named cylinder having an inlet and an automatic valve therein adapted to admit pressure to one side of the piston when the liquid is forced into its inlet, means adapted to be operated by the liquid under pressure in said valve casing for preventing the motion of the valve therein until the pressure increases to a predetermined point.

21. In a box shook machine, the combination of a set of arms adapted to swing down on the top of a box shook to hold it in position, a jaw for squeezing the parts of the shook together, a rotary pump, a pipe system connected with the pump, a cylinder having a piston therein movable in the same direction with said jaw and connected with it to move the jaws, a valve casing adjacent the last named cylinder having an inlet and an automatic valve therein adapted to admit pressure to one side of the piston when the liquid is forced into its inlet, means adapted to be operated by the liquid under pressure in said valve casing for preventing the motion of the valve therein until the pressure increases to a predetermined point, and both hand operated and automatic means for moving said valve to open the inlet, to the cylinder, the latter connected to act when the squeeze jaw moves to wide open position.

22. In a box shook machine, the combination of a set of pivoted arms adapted to swing against a box shook, a jaw for squeezing the parts of the shook together, a vertical cylinder having a piston therein, means for connecting said piston with the arms to force them down by liquid pressure, a rotary pump, a pipe system connected with the pump, a hand operated valve in said system for connecting it with said vertical cylinder and for returning the liquid to the pump, a horizontal cylinder having a piston therein movable in the same direction as said jaw and connected with it to move the jaw, a valve casing adjacent the horizontal cylinder having an inlet and an automatic valve therein adapted to admit pressure to one side of the second piston when the liquid is forced into the inlet, a pop valve connected with the piping system and with said inlet arranged to admit liquid into said inlet when the pressure in the pipe system reaches a predetermined degree, hand operated means for moving the automatic valve into position to close the inlet, a lever at the side of the machine, means connected with said lever for operating said valve to open the inlet to the cylinder, means also connected with said lever for operating the first named valve to admit liquid to the vertical cylinder at the same time, whereby said vertical cylinder will act first to bring down the arms and the horizontal cylinder will be supplied with liquid only after the pressure has time to reach its limit and operate the pop valve, and means movable with said jaw for automatically closing said cylinder inlet when the jaw moves to a wide open position.

23. In a box shook machine, the combination of a jaw for squeezing the parts of the shook together, a rotary pump, a pipe system connected with the pump, a cylinder having a piston therein movable in the same direction as said jaw and connected with it to move the jaw, a valve casing adjacent the cylinder having an inlet and an automatic valve therein adapted to admit pressure to one side of the piston when the liquid is forced into the inlet, hand operated means for moving the automatic valve into position to close the inlet, a lever at the side of the machine, means connected with said lever for operating said valve to open the inlet, and means movable with said jaw for automatically closing said inlet when the jaw moves to a wide open position.

In testimony whereof we have hereunto affixed our signatures.

HENRY A. GALE.
ORNAN S. COOK.